United States Patent [19]
Maksymkiw et al.

[11] Patent Number: 5,717,025
[45] Date of Patent: Feb. 10, 1998

[54] MELAMINE-FORMALDEHYDE RESIN BASED ADHESIVE COMPOSITIONS

[75] Inventors: Michael J. Maksymkiw, White Bear Lake; Michael J. Dochniak, Stillwater, both of Minn.

[73] Assignee: H. B. Fuller Licensing & Financing, Inc., St. Paul, Minn.

[21] Appl. No.: 714,721

[22] Filed: Sep. 16, 1996

[51] Int. Cl.[6] .................... C08J 3/00; C08K 3/20; C08L 75/00; B32B 27/00
[52] U.S. Cl. .................. 524/591; 428/423.1; 524/539; 524/839; 524/840
[58] Field of Search .................... 524/539, 591, 524/839, 840; 428/423.1

[56] References Cited

U.S. PATENT DOCUMENTS

| | | | |
|---|---|---|---|
| 3,919,351 | 11/1975 | Chang et al. | 260/850 |
| 4,066,591 | 1/1978 | Scriven et al. | 260/29.2 TN |
| 4,147,679 | 4/1979 | Scriven et al. | 260/29.2 TN |
| 4,558,090 | 12/1985 | Drexler et al. | 524/591 |
| 4,574,147 | 3/1986 | Meckel | 528/64 |
| 4,791,168 | 12/1988 | Salatin et al. | 524/601 |
| 5,202,364 | 4/1993 | Taniguchi et al. | 523/403 |
| 5,334,690 | 8/1994 | Schafheutle et al. | 528/71 |
| 5,460,829 | 10/1995 | Bederke et al. | 428/482 |
| 5,512,322 | 4/1996 | Hille et al. | 427/407.1 |
| 5,523,344 | 6/1996 | Maksymkiw et al. | 524/507 |
| 5,585,146 | 12/1996 | Uenaka et al. | 427/407.1 |

FOREIGN PATENT DOCUMENTS

| | | |
|---|---|---|
| 928323 | 6/1973 | Canada . |
| 1128568 | 10/1966 | Germany . |
| 3903804 | 8/1990 | Germany . |
| WO 95/08583 | 3/1995 | WIPO . |
| WO 96/07540 | 3/1996 | WIPO . |
| WO 97/19121 | 5/1997 | WIPO . |

OTHER PUBLICATIONS

U.S. application No. 08/304653, Youlu Duan et al., filed Sep. 9, 1994.

U.S. application No. 08/343676, Youlu Duan et al., filed Nov. 22, 1994.

U.S. application No. 08/561197, Jillian N. Ierien et al., filed Nov. 21, 1995.

*Primary Examiner*—Patrick D. Niland
*Attorney, Agent, or Firm*—Nancy N. Quan; Carolyn A. Fischer

[57] ABSTRACT

Melamine-formaldehyde based adhesive compositions having enhanced bond strengths when subjected to thermal and mechanical stresses. The invention further describes a process wherein melamine-formaldehyde resins are reacted with amines in the presence of water-based sulfonated polyurethane-urea polymers. The process substantially reduces the release of formaldehyde and generates a network of interpenetrating polymers having enhanced peel adhesion failure temperatures.

14 Claims, No Drawings

MELAMINE-FORMALDEHYDE RESIN BASED ADHESIVE COMPOSITIONS

BACKGROUND OF THE INVENTION

This invention relates to melamine-formaldehyde resin based adhesives, specifically to a process wherein melamine-formaldehyde resins are reacted with amines in the presence of water-based sulfonated polyurethane-urea polymers.

DESCRIPTION OF THE PRIOR ART

It is known that melamine-formaldehyde resins are used as crosslinking agents for the preparation of adhesives. For example, water-based sulfonated polyurethane-urea polymers are often used with said resins to enhance properties such as adhesion and peel strengths. Several patents describing such compositions are described below.

Canadian Pat. No. 928,323 (Farbenfabriken Bayer Aktiengesellschaft, Leverkusen, Germany) discloses water-based sulfonated polyurethane-urea polymers which are crosslinked by means of polyfunctional compounds which liberate formaldehyde or react like formaldehyde (e.g., hexamethylolmelamine resins).

German Pat. No. 1,128,568 (Farbenfabriken Bayer Aktiengesellschaft, Leverkusen, Germany) discloses water-based sulfonated polyurethane-urea polymers which are crosslinked with melamine-hexamethylol-hexamethyl ether in the presence of formic acid.

U.S. Pat. No. 3,919,351 (PPG) discloses water-based anionic polyurethane-urea polymers which are crosslinked with melamine resin curing agents in the presence of para-toluene sulfonic acid.

U.S. Pat. No. 5,334,690 (Hoechst Aktiengesellschaft, Fed. Rep. of Germany) discloses sulfonated polyurethane dispersions which can be crosslinked with emulsifiable melamines to improve the polymers heat distortion properties and peel strength.

Other related patents include U.S. Pat. No. 5,523,344 (H. B. Fuller Licensing & Financing), U.S. Pat. No. 4,066,591 and No. 4,147,679 (PPG Industries, Inc.), U.S. Pat. No. 4,791,168 (BASF Corporation, Inmont Division) and DE Pat. No. 3,903,804 (Bollig & Kemper KG).

There remains a need for two-component water-based adhesives having enhanced bond strengths when subjected to thermal and mechanical stresses. The present invention discloses a process which forms adhesive compositions having increased peel adhesion failure temperatures compared to previously known two-component systems.

Additionally, a draw back with the melamine-formaldehyde resin based adhesives described in the prior art references relate to sluggish and/or incomplete reactivity and the release of formaldehyde. Melamine-formaldehyde resins contain methylol groups which slowly combine/rearrange and/or react with active hydrogen atoms such as primary hydroxyl groups to release formaldehyde, which is a pungent-poisonous gas. To help accelerate the reaction, acid catalysts and/or elevated temperatures are often used. Under these conditions, the volatilization of formaldehyde increases and additional precautions must be taken to limit worker exposures through inhalation.

Therefore, there remains a need for a process which accelerates melamine-formaldehyde resin curing while reducing the release of formaldehyde.

SUMMARY OF THE INVENTION

The present invention discloses water-based adhesive compositions comprising:

1. at least one water-based sulfonated polyurethane-urea polymer comprising;
   a) at least one polyisocyanate; and
   b) at least one sulfonated polyester polyol wherein the sulfo groups are present in the form of alkali metal salts;
2. at least one water dispersible melamine-formaldehyde resin; and
3) at least one compound having primary amine and/or secondary amine functional groups.

Surprisingly, the adhesive compositions are characterized as having peel adhesion failure temperatures greater than about 115° C. using a 1.5 kg. static load. It is surmised that the unique heat resistance properties can be attributed to the inherent properties of the sulfonated polyurethane-urea polymers and the melamine-formaldehyde/amine condensation reaction which may form interpenetrating polymer networks.

In another aspect, the invention discloses a process for the preparation of water-based adhesives compositions, which substantially reduces the release of formaldehyde, wherein melamine-formaldehyde resins are reacted with amines in the presence of water-based sulfonated polyurethane-urea polymers. The process comprising:

1. forming a water-based sulfonated polyurethane-urea polymer by reacting;
   a) at least one polyisocyanate; and
   b) at least one sulfonated polyester polyol wherein the sulfo groups are present in the form of alkali metal salts;
2. forming a pre-mix by combining;
   a) at least one water dispersible melamine-formaldehyde resin; and
   b) at least one compound having primary amine and/or secondary amine functional groups; then
3. combining the products of 1 and 2;

wherein the methylol groups, present on the melamine-formaldehyde resin, react with amines to release water and form a crosslinked polymer network.

DETAILED DESCRIPTION OF THE INVENTION

The compositions of the present invention have increased peel adhesion failure temperatures when subjected to elevated thermal and mechanical stresses. It is surmised that the melamine-formaldehyde/amine condensation reaction, which may form interpenetrating polymer networks, contributes to improved performance. The term "interpenetrating polymer network" is defined as a crosslinked and/or semi crosslinked system comprising at least two dissimilar or different polymers. IPNs are further described in the "Handbook of Adhesives", Irving Skeist, 3rd edition, chapter 1, page 18, Van Nostrand, N.Y., 1990.

Additionally, the compositions have enhanced pot stability at ambient room temperatures. The term "pot stability" is defined as a materials resistance to viscosity change. It is further surmised that the strong ionic character of the sulfonated polyurethane-urea polymers contribute to improved pot stability. For example, the sulfonated polyurethane-urea polymers utilize alkali metal hydroxides such as sodium hydroxide or potassium hydroxide. Said salt can develop a strong association and hence can reduce viscosity increase and/or gelation through a sulfonic acid/polyamine ionic crosslink.

The sulfonated polyurethane-urea polymers of the present invention may be formed using monoisocyanates and polyisocyanates. The isocyanates may be linear aliphatic, cyclic aliphatic, aromatic and mixtures thereof. Examples of commercially available polyisocyanates include Vestanat® IPDI which is isophorone diisocyanate from HULS America, Inc. (Piscataway, N.J.), TMXDT® which is tetramethylxylene diisocyanate from Cyanamid (Wayne, N.J.), Luxate® HM which is hexamethylene diisocyanate from Olin Corporation (Stamford, Conn.), diphenylmethane diisocyanate from Upjohn Polymer Chemicals (Kalamazoo, Mich.), Desmodur® W which is dicyclohexylmethane-4,4'-diisocyanate from Mobay Corporation (Pittsburgh, Pa.) and toluene diisocyanate (TDI). The preferred diisocyanates are hexamethylene diisocyanate, isophorone diisocyanate and their mixtures.

The sulfonated polyester polyol component used in the preparation of the polyurethane-urea polymer can have hydroxyl numbers, as determined by ASTM. Designation E-222-67 (METHOD B), in a range of from about 20 to about 140, and preferably from about 55 to about 110. The polyols may be formed with components such as diacids, diols, sulfonate diols and sulfonate diacids. Such polyols and their preparation are further described in U.S. Pat. No. 5,334,690, incorporated herein by reference. The preferred sulfonated polyester polyols are based on 5-sulfoisophthalic acid monosodium salt, adipic acid and 1,6-hexanediol and/or diethylene glycol.

Optionally, non-sulfonated polymeric diols may be used in combination with the sulfonated polyester polyols. Such polyols may have hydroxyl numbers in a range of from about 20 to about 140, and preferably from about 40 to about 110. The non-sulfonated polymeric polyols may include polyester polyols, polyether polyols, polycarbonate polyols, polyurethane polyols, polyacetal polyols, polyacrylate polyols, polycaprolactone polyols, polyesteramide polyols, polythioether polyols, and mixtures thereof.

Alkylene diols may also be used in the preparation of the polyurethane-urea polymers. The alkylene diols may have hydroxyl numbers in a range of from about 130 to about 1250, and preferably from about 950 to about 1250. The preferred alkylene diols include 1,4-butanediol, 1,6-hexanediol and 2-methyl-1,3-propanediol and may be present in the isocyanate-terminated polyurethane prepolymer in a range of from about 0.1% by weight to about 10.0% by weight, and preferably from about 0.5% by weight to about 5.0% by weight, based on 100 part total polyurethane-urea polymer solids.

Higher functional polyols may be used in place of or in conjunction with alkylene diols. Suitable examples include glycerol, trimethylolpropane, 1,2,4-butane triol, 1,2,6-hexane triol and mixtures thereof. The preferred higher functional polyol is trimethylolpropane. Said polyols may be present in a range of from about 0.1% by weight to about 1.0% by weight, and preferably from about 0.3% by weight to about 0.7% by weight, based on 100 parts total polyurethane-urea polymer solids.

Optionally, dihydroxy carboxylic acids may be used when preparing the polyurethane-urea polymers. A preferred dihydroxy carboxylic acid is dimethylolpropionic acid. The dihydroxy carboxylic acid component may be present in a range of from about 0.05% by weight to about 1.0% by weight, and preferably from about 0.2% by weight to about 0.5% by weight, based on 100 parts total polyurethane-urea polymer solids.

Neutralization of said dihydroxy carboxylic acid groups can be accomplished with compounds such as alkali metal hydroxides, organic tertiary amines, ammonia and mixtures thereof. Preferred neutralizing agents are sodium hydroxide and triethylamine. Conversion of the acid groups to ionic groups (salts) can be accomplished before or after the isocyanate-terminated polyurethane prepolymer has been dispersed in water.

The polyurethane-urea polymers are prepared by reacting a stoichiometric excess of polyisocyanate with a polyol and/or polyamine component to form an isocyanate-terminated prepolymer. The reactants are in such proportions that the resulting percent isocyanate may be in a range of from about 1.0% by weight to about 10.0% by weight, and preferably from about 2.0% by weight to about 5.0% by weight, based on 100 parts total prepolymer solids. Said prepolymers may be processed at temperatures in a range of from about 30° C. to about 110° C., and preferably from about 65° C. to about 85° C.

If desired, small amounts of co-solvent may be used in the preparation of the isocyanate-terminated prepolymer. Suitable examples include acetone, 1-methyl-2-pyrrolidinone and their mixtures thereof. The co-solvent may be present in the prepolymers in a range of from about 1.0% by weight to about 15.0% by weight, and preferably from about 2.0% by weight to about 5.0% by weight, based on total prepolymer solids.

Additionally, small quantities of catalysts may be used to accelerate the hydroxyl/isocyanate reaction. The catalysts can be present in a range of from about 0.05% by weight to about 2.0% by weight, and preferably from about 0.13% by weight to about 0.15% by weight, based on 100 parts total isocyanate-terminated polyurethane prepolymer solids. An example includes Metacure™ T-12 which is dibutyltin dilaurate from Air Products and Chemical, Inc. (Allentown, Pa.).

Once the isocyanate-terminated prepolymer has been formed, it can be dispersed in distilled/de-ionized water using agitation. The water temperature before dispersing can be in a range of from about 5° C. to about 100° C., and preferably from about 20° C. to about 60° C. Lower water temperatures are preferred in that lower temperatures tend to generate a lower mean particle size and narrow distribution to enhance the dispersions coatesting or film forming properties.

The water-based isocyanate-terminated prepolymer can then be reacted with water and/or water soluble amines. The water soluble amines may be monoamine, polyamines and their mixtures. Suitable examples include ammonia, monoethanolamine, hydrazine, ethylene diamine and diethylene triamine. Said amines can be added to the aqueous medium at an equivalence ratio of amine active hydrogen to isocyanate in a range of from about 0.01:1.0 to about 2.0:1.0, and preferably from about 0.5:1.0 to about 0.9:1.0. The dispersion temperature during the prepolymer/amine reaction can be in a range of from about 20° C. to about 100° C., and preferably from about 40° C. to about 70° C.

The water-based adhesive compositions are formed using a process wherein a melamine-formaldehyde resin/amine premix is combined with at least one water-based sulfonated polyurethane-urea polymer. Alternatively, it is possible to disperse the melamine-formaldehyde resin in the water-based sulfonated polyurethane-urea polymer followed by amine addition. The components are preferably combined at ambient room temperature with agitation. It is surmised that the methylol groups present in the melamine-formaldehyde resin react with primary and/or secondary amines, release water as a by-product, and form a vast three-dimensional polymer network. The melamine-formaldehyde/amine condensation reaction is further described in "The Chemistry of Amino Group", edited by Saul Patai, John Wiley & Sons, New York, 1968, pp. 301–302, incorporated herein by reference.

At least one melamine-formaldehyde resin is used. The resin may be present in the formulations in a range of from about 1.0% by weight to about 15.0% by weight, and preferably from about 5.0% by weight to about 10.0% by weight, based on the total solids. The melamine-formaldehyde resins may be partially or fully alkylated and commercially available resins include Cymel® Resin 303, 385 and 325 from Cytec Industries, Inc. (West Paterson, N.J.). The preferred resins are soluble and/or dispersible in water.

Other water dispersible formaldehyde based crosslinking agents may be used in the present invention and include urea-formaldehyde resins, benzoquanamine-formaldehyde resins and glycoluril-formaldehyde resins.

At least one compound containing primary amines and/or secondary amines is used to form a pre-mix. Said amines may include monoamines, polyamines and their mixtures thereof. Water soluble amines are preferred and suitable examples include ammonia, monoethanolamine, ethylene diamine, diethylene triamine and triethylene tetramine. It is surmised that the melamine-formaldehyde resin/amine pre-mix improves bond formation, by increased reaction rates, and develops a more complete interpenetrating polymer network to enhance peel adhesion failure temperatures.

The primary and/or secondary amine functional compounds may contain other active hydrogen atoms. For example, amine and hydroxyl functional compounds may be used to care the melamine-formaldehyde resin. Suitable examples include the water dispersible poly (vinyl alcohol)-co-poly (vinylamine) polymers described in EP 0599245 assigned to Air Products and Chemicals, Inc. (Allentown, Pa.), such polyamines may have an amine content in a range of from about 0.5 meq. amine/gram material to about 3.5 meq. amine/gram material, and preferably from about 1.0 meq. amine/gram material to about 3.0 meq. amine/gram material. The number average molecular weight may be in a range of from about 10,000 grams/mol. to about 350,000 grams/mol., and preferably from about 30,000 grams/mol. to about 250,000 grams/mol. Said polyamines can be present in the formulations in a range of from about 0.1% by weight to about 15.0% by weight, and preferably from about 1.0% by weight to about 10.0% by weight, based on 100 parts total solids.

The melamine-formaldehyde/amine premix can be blended into the water-based sulfonated polyurethane-area polymer in a range of from about 1.0% by weight to about 50.0% by weight and preferably, from about 2.0% by weight to about 6.0% by weight, based on the total weight of the dispersion.

Additionally, small quantities of acid catalysts may be used to accelerate the melamine-formaldehyde resin/amine reaction. The catalyst can be present in a range of from about 0.05% by weight to about 5.0% by weight, and preferably from about 0.1% by weight to about 2.5% by weight, based on the total weight of the dispersion. A suitable catalyst includes Nacure XP-357 which is a blocked para-toluene sulfonic acid from King Industries, Inc. (Norwalk, Conn.).

In order to meet requirements in adhesive applications, such as tack, green strength and cost, it may be desirable to formulate the compositions of the present invention with non-polyurethane based water dispersible polymers including acrylics, vinyl/acrylics, styrene/acrylics, vinyl-acetate/ethylene copolymers, polychloroprenes, styrene emulsions, stryene/butadiene emulsions, starches, dextrins, caseins, animal pectins and their mixtures. When present in the formulations, said non-polyurethane based dispersions may be present in a range of from about 5.0% by weight to about 80.0% by weight, and preferably from about 10.0% by weight to about 50.0% by weight, based on the total weight of the dispersion.

The water-based adhesives may have initial viscosities in a range of from about 10 mPa.s to about 5,000 mPa.s, and preferably from about 500 mPa.s to about 1,000 mPa.s. Said viscosities are preferred in that lower initial viscosities allows the end user to selectively increase viscosity with thickening agents. Alternatively, water-based adhesive compositions having high initial viscosities (i.e., greater than about 5,000 mPa.s) are often lowered by dilution with water and this can be detrimental in many applications. Higher levels of solvent can extend the dry times and slow down the production process. Additionally, equipment such as heaters may be required to accelerate the evaporation of water thus increasing the complexity and cost of the operation.

The adhesives may have a solids content in a range of from about 35.0% by weight to about 70.0% by weight, and preferably from about 45.0% by weight to about 65.0% by weight. A solids content outside said ranges can be detrimental in that lower solids extend dry times and higher solids may increase initial viscosities making the compositions more difficult to process.

The inventive compositions may be used as an adhesive, binder, coating or primer an can be applied to substrates including paper, wood, leather, metal, glass, cloth, natural rubber, ceramics and synthetic polymers including acrylonitrile-butadiene-stryene (ABS), polyvinyl chloride and polypropylene. Also, the compositions may be applied to said substrates using application methods known in the art including brushing, roll coating and spraying.

The characteristics of the water-based adhesive formulations may be modified by the addition of compounds including surfactants, defoaming agents, coalescing aids, fungicides, bactericides, polyfunctional crosslinking agents, plasticizers, thickening agents, fillers, pigments, reactive pigments, dispersing agents for the pigments, colors, perfume-like materials, UV stabilizers, sequestering agents, waxes, oils, fire retardant agents and organic solvents. Such materials may be introduced at any stage of the production process.

The present invention is further illustrated by the following examples.

EXAMPLES

The following test methods were used:

Peel Adhesion Failure Temperature Test (PAFT)

The test samples were prepared in the following manner: Approximately 1.5 grams of a water-based adhesive composition was coated onto a 2.5 cm by 2.5 cm area located on the end of a 2.5 cm by 10.5 cm strip of canvas. The coated substrates were dried at ambient room temperature and matted with a second piece of canvas, in a T-peel configuration, and pressed together using a Sentinal® Heat Sealer Model 808/1 (Sencorp Systems, Inc., Mass.) at 65° C. for 20 seconds with 3.5 kgs/cu cm nip pressure. After aging, the strips were attached to a static load and placed in a Tenny® oven. The bonds were subjected to a 25° C. increase in temperature each hour until bond failure. Failure temperatures were automatically recorded by the Tenny® oven sensing unit.

Viscosity Test

The water-based adhesive compositions were aged at ambient room temperature and tested at 24 hour intervals using a Brookfield Viscometer-model RTV from Brookfield Engineering Laboratories, Inc., (Stoughton, Mass.). Viscosities were measured using a #2 spindle at 20 revolutions per minute.

Example 1

Example 1 describes the preparation of a water-based adhesive composition having increased peel adhesion failure temperatures and improved pot stability. The inventive compositions are compared to commercially available two-component water-based sulfonated polyurethane-urea compositions.

Compound 1

Compound 1 describes the preparation of a water-based sulfonated polyurethane-urea polymer.

To a reaction flask was charged 21.43 grams (0.021 hydroxyl equivalence) of molten Rucoflex® XS-5483-55 which is a sulfonated polyester polyol from Ruco Corporation, 1.00 grams (0.015 hydroxyl equivalence) dimethylolpropionic acid and 1.127 grams (0.025 hydroxyl equivalence) 1,4-butanediol. The mixture was heated to 55° C. then charged with 3.11 grams (0.0279 isocyanate equivalence) isophorone diisocyanate, 4.71 grams (0.056 isocyanate equivalence) 1,6-hexamethylene diisocyanate and 7.01 grams anhydrous acetone. The mixture was heated at 70° C. for approximately 3 hours then cooled to 55° C. The resulting isocyanate-terminated polyurethane prepolymer was charged with 0.60 grams (0.006 moles) triethylamine then stirred for 10 minutes. The prepolymer was dispersed in 55.43 grams de-ionized water and chain extended with a solution containing 0.54 grams (0.02 amine equivalence) ethylenediamine and 5.0 grams de-ionized water. The water-based sulfonated polyurethane-urea polymer properties are described below:

pH=8.0

Solids=35.0%

Viscosity=250 mPa.s

Compound 2

Compound 2 describes the compositions of the present invention wherein a melamine-formaldehyde resin is reacted with an amine in the presence of the polymer described in Example 1.

To 86.8 grams of the dispersion described as Compound 1 was charged a premix containing 10.0 grams Cymel® 385, 2.5 grams Nacure XP-357 and 0.6 grams triethylenetetramine. The premix was added to the polymer dispersion using agitation.

The composition's viscosity profile is described below:

| Time (Hours) | Viscosity (mPa.s) |
|---|---|
| Initial | 50 |
| 24 | 50 |
| 48 | 60 |
| 72 | 60 |
| 192 | 150 |

Compound 3

Compound 3 is Disperscoll® U-53 which is a commercially available water-based sulfonated polyurethane polymer from Bayer Corporation (Pittsburgh, Pa.).

Compound 4

Compound 4 describes the process of the present invention using Compound 3.

To 86.8 grams of the dispersion described as Compound 3 was charged a premix containing 10.0 grams Cymel® Resin 385, 2.5 grams Nacure XP-357 and 0.6 grams triethylenetetramine. The premix was added to the polymer dispersion using mild agitation at ambient room temperature.

The comparative composition had a viscosity profile described below:

| Time (Hours) | Viscosity (mPa.s) |
|---|---|
| Initial | 50 |
| 24 | 50 |
| 48 | 50 |
| 72 | 50 |
| 94 | Solid |

Compound 1, 2, 3 and 4 were evaluated using the Peel Adhesion Failure Temperatures Test. The results are diagrammed below:

| PAFT | 24-HOUR AGING | 168-HOUR AGING |
|---|---|---|
| Compound 1 | 99.2° C. | 98.7° C. |
| Compound 2 | 168.7° C. | 164.3° C. |
| Compound 3 | 100.4° C. | 100.6° C. |
| Compound 4 | 80.2° C. | 102.2° C. |

The data shows the inventive composition (Compound 2) has a higher peel adhesion failure temperature compared to Compound 1, 3 and 4, showing the utility of the invention.

Example 2

Example 2 evaluates the peel adhesion failure temperatures of a sulfonated polyurethane-urea polymer compared to a carboxylic acid based polyurethane-urea polymer using the process of the present invention.

Compound 1

Compound 1 is the composition described as Compound 2 in Example 1.

Compound 2

Compound 2 is the composition described as Compound 4 in Example 1 with the exception Disperscoll® U-53 was replaced with Neorez® 9621 which is an anionic polyurethane-urea dispersion from Zeneca Resins (Willmington, Mass.).

Compound 1 and Compound 2 were evaluated using the Peel Adhesion Failure Temperatures Test with the exception a 1 kg. weight was used. The results are diagrammed below:

| PAFT | 24-HOUR AGING |
|---|---|
| Compound 1 | 182° C. |
| Compound 2 | 110° C. |

We claim:

1. A water-based sulfonated polyurethane-urea adhesive composition comprising:
   a) at least one water-based sulfonated polyurethane-urea polymer comprising the reaction product of;
      i) at least one polyisocyanate;
      ii) at least one sulfonated polyester polyol wherein the sulfo groups are present in the form of alkali metal salts; and iii) at least one compound which contains amines selected from the group consisting of primary amines, secondary amines and mixtures thereof; with b) at least one water dispersible melamine-formaldehyde resin; and c) at least one compound which contains amines selected from the group consisting of primary amines, secondary amines and mixtures thereof.

2. The adhesive composition of claim 1, wherein said composition is formed by the reaction product of:
   a) at least one water-based sulfonated polyurethane-urea polymer comprising the reaction product of;
      i) at least one polyisocyanate;
      ii) at least one sulfonated polyester polyol wherein the sulfo groups are present in the form of alkali metal salts; and
      iii) at least one compound which contains amines selected from the group consisting of primary amines, secondary amines and mixtures thereof; with
   b) at least one water dispersible melamine-formaldehyde resin; and
   c) at least one compound which contains amines selected from the group consisting of primary amines, secondary amines and mixtures thereof.

3. The adhesive composition of claim 2, wherein said composition forms an interpenetrating polymer network.

4. The adhesive as described in claim 1, wherein said polyurethane-urea polymer is formed from at least one polyisocyanate selected from the group consisting of linear aliphatic, cyclic aliphatic, aromatic and mixtures thereof.

5. The adhesive composition of claim 4, wherein the polyisocyanate is selected from the group consisting of isophorone diisocyanate, hexamethylene diisocyanate and mixtures thereof.

6. The adhesive composition of claim 1, wherein said polyol comprises the reaction product of 5-sulfoisophthalic acid monosodium salt, adipic acid, 1,6-hexanediol and diethyleneglycol.

7. The adhesive as described in claim 1, wherein said polyurethane-urea polymer comprises at least one sulfonated polyester polyol and at least one non-sulfonated polyol.

8. The adhesive as described in claim 1, wherein said melamine-formaldehyde resin is a partially alkylated polymeric melamine-formaldehyde resin.

9. The adhesive composition as described in claim 1, wherein the amine c) is selected from the group consisting of monoamines, polyamines and mixtures thereof.

10. The adhesive composition of claim 9, wherein the amine c) is selected from the group consisting of monoethanolamine, ethylenediamine, diethylenetriamine, triethylenetetramine, poly(vinyl alcohol)co-poly (vinyl amine polymers and mixtures thereof.

11. The adhesive as in claim 1, wherein said composition is characterized as having a peel adhesion failure temperature greater than about 115° C. using a 1.5 kilogram static load.

12. An article comprising a substrate, and a dried polymer layer comprising the composition of claim 1, wherein at least one portion of said substrate is selected from the group consisting of paper, wood, metal, glass, cloth, concrete and synthetic polymers.

13. A process for the preparation of water-based sulfonated polyurethane-urea adhesive compositions comprising the steps of:
   a) providing a water-based sulfonated polyurethane-urea polymer comprising the reaction product of;
      i) at least one polyisocyanate;
      ii) at least one sulfonated polyester polyol wherein the sulfo groups are present in the form of alkali metal salts; and
      iii) at least one compound which contains amines selected from the group consisting of primary amines, secondary amines and mixtures thereof;
   b) providing a pre-mix by combining;
      i) at least one water dispersible melamine-formaldehyde resin; and
      ii) at least one compound which contains amines selected from the group consisting of primary amines, secondary amines and mixtures thereof; then
   c) combining the products of a) and b).

14. A process for the preparation of water-based sulfonated polyurethane-urea adhesive compositions comprising the steps of:
   a) providing a water-based sulfonated polyurethane-urea polymer comprising the reaction product of;
      i) at least one polyisocyanate;
      ii) at least one sulfonated polyester polyol wherein the sulfo groups are present in the form of alkali metal salts; and
      iii) at least one compound which contains amines selected from the group consisting of primary amines, secondary amines and mixtures thereof;
   b) combining the product of a) with at least one water dispersible melamine-formaldehyde resin to form a dispersion mixture; then
   c) combining the dispersion mixture with at least one compound which contains amines selected from the group consisting of primary amines, secondary amines and mixtures thereof.

* * * * *